May 13, 1924.  1,494,294

M. B. SHERIDAN ET AL

CAMERA

Filed Oct. 31, 1921

Inventors:
Michael B. Sheridan
Frederick W. Flood
By
James L. Norris
Attorney

Patented May 13, 1924.

1,494,294

UNITED STATES PATENT OFFICE.

MICHAEL BRINSLEY SHERIDAN AND FREDERICK WILLIAM FLOOD, OF PERTH, WESTERN AUSTRALIA, AUSTRALIA.

CAMERA.

Application filed October 31, 1921. Serial No. 511,929.

*To all whom it may concern:*

Be it known that we, MICHAEL BRINSLEY SHERIDAN and FREDERICK WILLIAM FLOOD, both subjects of the King of Great Britain, residing at 369 Beaufort Street, Perth, Western Australia, Commonwealth of Australia, have invented certain new and useful Improvements in Cameras, of which the following is a specification.

This invention relates to photographic cameras of the type wherein a holder which is insertible into and removable from the case of the camera carries a spool of sensitized film which is drawn across an exposure opening and, after exposure, wound upon a second spool at the other side of the holder. One of the principal objects of the invention is to so construct the camera case and the holder that the holder is locked or secured against withdrawal from the case until a dark slide, which serves to cover the exposure opening in the holder, is in place, thus making it impossible to "light strike" the film by withdrawing the holder from the camera case before the dark slide is replaced in the holder.

Our invention although principally devised for use in connection with roll films is also adapted for use with plates and cut films or packs. By means of this invention we attain a "first sight" and accurate focus in a focal plane and without the aid of a view finder whose use may be optional.

The holder, with the roll film and plate holder or film pack carried thereby, as a combined unit is adapted to be withdrawn to a sufficient distance when it is desired to obtain a focus for the taking of the intended photograph. When such focus is obtained the said holder is returned to its normal or operative position and by the withdrawal of the dark slide therefrom said case becomes automatically locked with the outer containing box and is then ready for the taking of the photograph, while by the subsequent insertion of said dark slide the case is unlocked from said outer box and is free for withdrawal when it is desired to obtain another focus.

Figure 1:
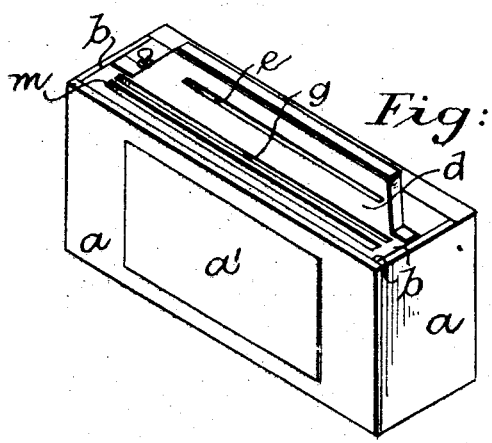
Figure 3:
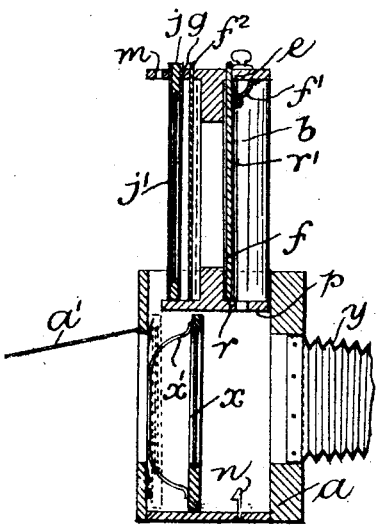
Figure 2:
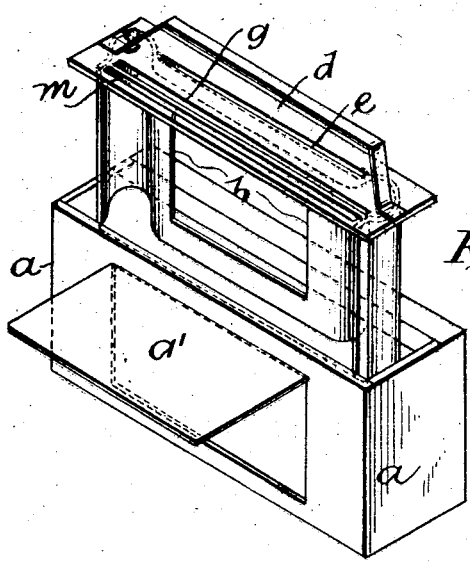
Figure 5:
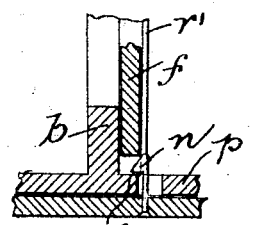
Figure 4:
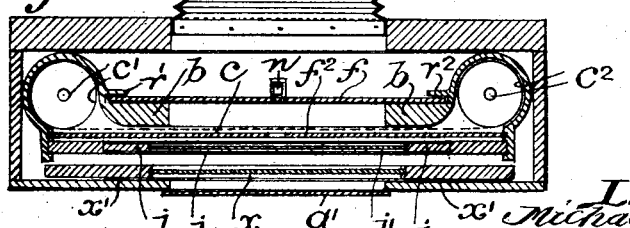

The construction and use of our invention will now be described with the aid of the attached drawings wherein Fig. 1 is a perspective view showing the partially withdrawable holder in its closed down position within its outer containing box. Fig. 2 is a perspective view showing said holder partially withdrawn from the case and the dark slide removed. Fig. 3 is a sectional end view, the parts being shown in the same position as in Fig. 2 but with the dark slide in position. Fig. 4 is a sectional plan view and Fig. 5 is a view showing the locking and release means for the withdrawable holder, and wherein the dark slide is shown as engaging with said means to allow of the withdrawal of said holder as a unit with its therein contained film-dark slide.

Referring to said drawings in detail:—In the camera case $a$ positioned at the rear of the camera bellows and which is equipped with focusing hood $a^1$, is fitted the holder $b$ which is adapted to be slidable and partially withdrawable from case $a$. This holder $b$ is operatively fitted and equipped with the roll film $c$ carried on the rotatable spools $c^1$ and $c^2$ as shown clearly in Fig. 4. In the top face member $d$ of the holder $b$ is formed a slot $e$ for the reception of the usual removable dark slide $f$ and also made with slot $g$ for a plate holder $j$ which contains the usual sensitive plate. The holder $b$ has a further rearwardly positioned slot $m$ within which is nested the said removable dark slide $f$ when same is not in use and as seen in Figs. 3 and 4. This dark slide $f$, when in its lowered normal position, as seen in Fig. 5, is adapted to make engagement with the bevel nose of a spring catch $n$ which is carried by the bottom of the camera case $a$ and extends through an aperture in the bottom $p$ of the holder $b$ adjacent the slot or slideway $e$ and engages a shoulder $r$ on the bottom of the holder $b$. The engagement of the dark slide $f$ with the bevel nose of the spring catch $n$ forces the latter outwardly and frees it from holding contact with the shoulder $r$ on the holder $b$, thus releasing the holder to permit its withdrawal from the camera case $a$, as shown in Figs. 2 and 3. The dark slide $f$ is held in "light tight" position by the blade-like spring $f'$.

Upon the withdrawal of the film-containing holder $b$ the focusing screen $x$ is automatically moved forwardly into correct focal position, for which purpose preferably bow-shaped leaf springs $x'$ are carried by the rear wall $x^2$ of the camera and engage the rear side of the focusing screen $x$, thus causing the focusing screen to move into the position previously occupied by the film $c$.

What we claim as our invention and desire to secure by Letters Patent is—

1. In a camera, a casing, a holder for sensitized material slidable into and out of operative position in said casing, said holder having a slideway for a dark slide, a dark slide movable in said slideway, a bevel nose spring catch carried by a wall of the casing and adapted to normally engage said holder adjacent said slideway to prevent the withdrawal of the holder from the casing, the bevel nose of said catch being directly engageable by the dark slide to release said catch when the dark slide is inserted in said slideway.

2. In a camera, a casing, a holder for sensitized material slidable into and out of operative position in said casing, said holder having a slideway for a dark slide and an aperture in its bottom adjacent said slideway, a spring catch carried by and extending upwardly from the bottom of said casing through said aperture and normally engaging said holder to prevent the withdrawal of the latter from the casing, and a dark slide adapted to slide in said slideway and adapted, when inserted in the latter, to engage the bevel nose of said catch to release the catch from the holder.

In testimony whereof we have hereunto set our hands in presence of two subscribing witnesses.

MICHAEL BRINSLEY SHERIDAN.
FREDERICK WILLIAM FLOOD.

Witnesses:
  RICHARD SPARROW,
  FRED'K LAMBERT.